United States Patent
Kim (10) Patent No.: US 8,171,097 B2
(45) Date of Patent: May 1, 2012

(54) APPARATUS, SYSTEM, AND METHOD OF PROCESSING PRINTING OPERATION ON HOME NETWORK

(75) Inventor: Do-heon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 546 days.

(21) Appl. No.: 11/648,673

(22) Filed: Jan. 3, 2007

(65) Prior Publication Data

US 2007/0153326 A1 Jul. 5, 2007

(30) Foreign Application Priority Data

Jan. 3, 2006 (KR) ........................ 10-2006-0000658

(51) Int. Cl.
*G06F 15/16* (2006.01)
(52) U.S. Cl. ........................ 709/211; 358/1.15; 358/1.16
(58) Field of Classification Search ................. 709/223, 709/226, 211, 217; 358/1.14, 1.15, 1.16, 358/1.13, 1.17, 1.18; 379/100.01–100.17
See application file for complete search history.

(56) References Cited

U.S. PATENT DOCUMENTS

| | | | |
|---|---|---|---|
| 6,292,267 B1* | 9/2001 | Mori et al. ................... | 358/1.15 |
| 6,327,045 B1* | 12/2001 | Teng et al. ................... | 358/1.15 |
| 6,369,907 B1* | 4/2002 | Aoki ............................ | 358/1.15 |
| 6,623,190 B1* | 9/2003 | Lutz ............................ | 400/76 |
| 7,038,796 B1* | 5/2006 | Gupta et al. ................. | 358/1.15 |
| 7,065,497 B1* | 6/2006 | Brewster et al. .............. | 705/14 |
| 7,218,406 B2* | 5/2007 | Al-Kazily et al. ............ | 358/1.15 |
| 7,317,550 B2* | 1/2008 | Lester et al. ................. | 358/1.16 |
| 7,577,155 B2* | 8/2009 | Yamamoto .................... | 370/400 |
| 2002/0135797 A1* | 9/2002 | Al-Kazily et al. ............ | 358/1.15 |
| 2002/0138564 A1* | 9/2002 | Treptow et al. ............... | 709/203 |
| 2003/0028614 A1* | 2/2003 | Jeon ............................ | 709/217 |
| 2003/0090697 A1* | 5/2003 | Lester et al. ................. | 358/1.14 |
| 2003/0188030 A1* | 10/2003 | Bellon ......................... | 709/250 |
| 2003/0206315 A1* | 11/2003 | Lester et al. ................. | 358/1.16 |

(Continued)

FOREIGN PATENT DOCUMENTS

| | | |
|---|---|---|
| CN | 1219710 A | 6/1999 |
| JP | 10-240456 A | 9/1998 |
| JP | 2003-036155 A | 2/2003 |
| JP | 2004-252984 A | 9/2004 |

(Continued)

OTHER PUBLICATIONS

Communication from the European Patent Office dated Apr. 7, 2010 issued in counterpart Application No. 06127362.9-1245.

*Primary Examiner* — Abdullahi Salad
*Assistant Examiner* — Jimmy H Tran
(74) *Attorney, Agent, or Firm* — Sughrue Mion, PLLC (57) ABSTRACT

An apparatus, a system, and a method of processing a printing operation on a home network that searches an available media storage device upon a request of a printing job of predetermined contents, transmits an address of the searched media storage device, and prints printing contents transmitted to the address are provided. The apparatus for processing a printing function on a home network includes a printing request management unit which processes a printing request transmitted from a printing controller on a home network; a media storage device processing unit which provides information on an available media storage device on the home network when printing job information is transmitted from the printing request management unit; and a printing management unit which downloads predetermined contents stored in the media storage device, and performs a printing job according to the printing request of the printing controller.

10 Claims, 10 Drawing Sheets

U.S. PATENT DOCUMENTS

| | | | |
|---|---|---|---|
| 2003/0218769 A1* | 11/2003 | Otsuka | 358/1.14 |
| 2004/0223185 A1* | 11/2004 | Yamada et al. | 358/1.15 |
| 2005/0068580 A1* | 3/2005 | Kuo et al. | 358/1.16 |
| 2005/0073716 A1* | 4/2005 | Maki | 358/1.15 |
| 2005/0076298 A1* | 4/2005 | Lutz | 715/527 |
| 2005/0114767 A1* | 5/2005 | Sato | 715/527 |

FOREIGN PATENT DOCUMENTS

| | | |
|---|---|---|
| KR | 1995-0016090 A | 6/1995 |
| KR | 10-2004-0058105 A | 7/2004 |
| KR | 10-2005-0077300 A | 8/2005 |
| WO | 00/76198 A1 | 12/2000 |
| WO | 02/076175 A2 | 10/2002 |

* cited by examiner

APPARATUS, SYSTEM, AND METHOD OF PROCESSING PRINTING OPERATION ON HOME NETWORK

CROSS REFERENCE TO RELATED APPLICATION

This application is based on and claims priority from Korean Patent Application No. 10-2006-0000658, filed on Jan. 3, 2006 in the Korean Intellectual Property Office, the disclosure of which is incorporated herein by reference in its entirety.

BACKGROUND OF THE INVENTION

1. Field of the Invention

Apparatuses, systems, and methods consistent with the present invention relate to processing a printing operation on a home network, and more particularly, to processing a printing operation on a home network that searches an available media storage device upon a request of a printing job of predetermined contents, transmits an address of the searched media storage device, and prints printing contents transmitted to the address.

2. Description of the Related Art

Figure 1:
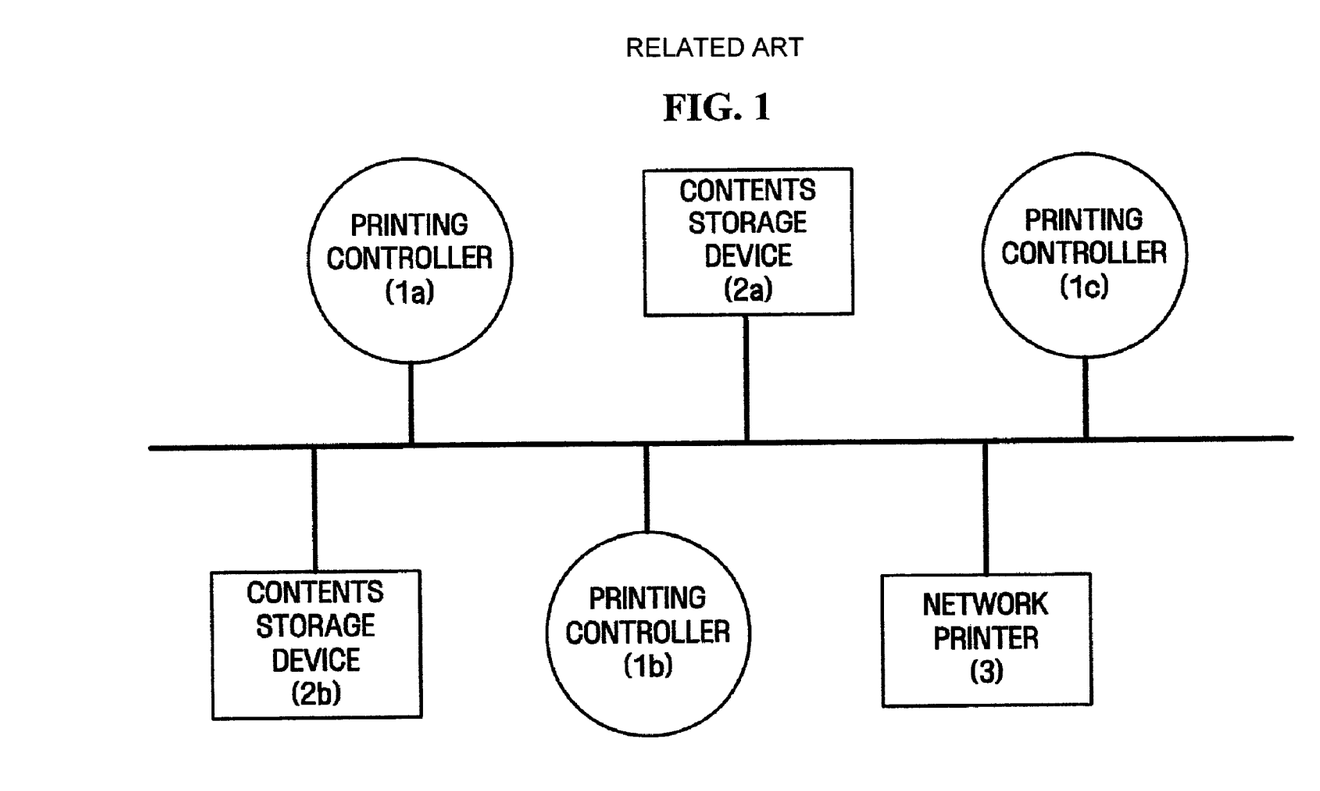
FIG. 1 is a diagram showing the configuration of a related art network printer on a home network.

FIG. 1 is a diagram showing the configuration of a related art network printer on a home network.

As shown in FIG. 1, in a home network environment, a plurality of contents storage devices 2a and 2b that store and manage premises media contents or various contents may exist, and a plurality of printing controllers 1a, 1b, and 1c that control the network printer may also exist. It is assumed that an environment related to a general home protocol function, such as discovery and control between the devices, has been already provided, and a known technique operates in such an environment.

Each of the printing controllers 1a, 1b, and 1c is a controller of premises network devices, and can be connected to the home network according to a user's request at any time. For example, the printing controllers 1a, 1b, and 1c include handheld mobile devices, such as digital cameras and cellular phones.

The contents storage devices 2a and 2b always exist on the home network on the premises, excluding a specified case, and continuously provide a user with their functions while the user is active.

According to an existing home protocol, the device discovery on the premises home network uses a Universal Plug and Play (UPnP) or Device Profile for Web Services (DPWS) multicast discovery mechanism. Further, the control is performed based on a SOAP (Simple Object Access Protocol) message protocol.

However, the premises network printer 3 on the home network does not have enough resources to perform printing according to the user's request.

For the premises network printer 3, the printing request and the control are set based on a personal computer (PC), and, thus the PC solves problems related to the resources and printing request management. However, for the network printer 3 on the home network, processing a printing request of a user is different from the existing process, and thus a mechanism different from the existing one is required in order to process the printing request of the user on the home network.

Figure 2:
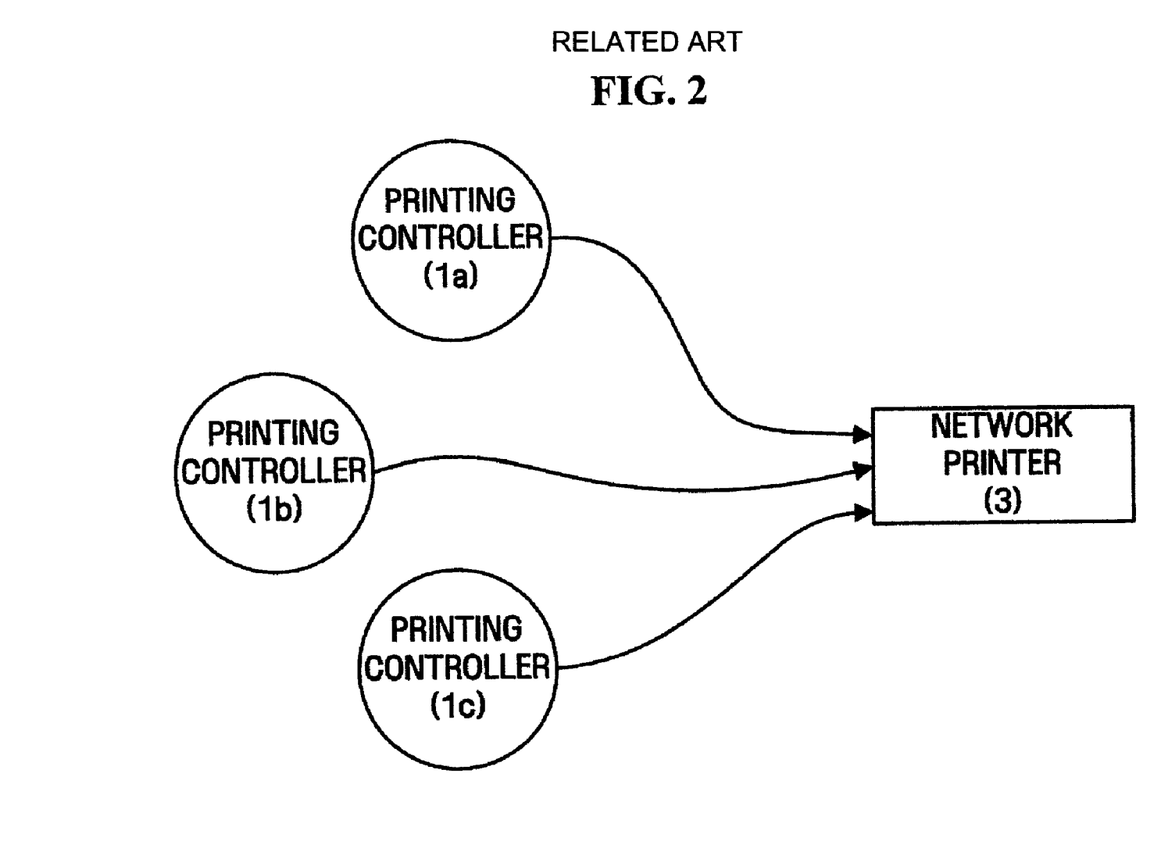
FIG. 2 is a diagram showing the operation of a related art network printer on a home network.

FIG. 2 is a diagram showing the operation of the related art network printer on the home network.

If the printing controllers 1a, 1b, and 1c are not the PC, the printing controllers 1a, 1b, and 1c transmit the contents to the premises network printer 3, together with the printing request.

At this time, if the size of the contents to be transmitted is so large that the network printer 3 cannot receive and process the contents, or if a printing request is made by another user on the premises at a similar time and the network printer 3 manages a printing list and performs a printing job, the network printer 3 needs to receive and manage the contents for the printing requests. For example, in the case of a digital camera, as the resolution increases, the size of an image becomes so large that a general printer cannot process the image. In this case, because of the limited printer resources, printing may be not performed.

In this case, the network printer 3 may receive only the latest printing request and reject other requests. Further, when each of the printer controllers 1a, 1b, and 1c is connected to the network until its turn comes around, the network printer 3 may receive the contents and process the printing request.

However, when the printing controllers 1a, 1b, and 1c are not the PC, if the printing request is made for the premises network printer 3, the network printer 3 should mange the request and the contents. Accordingly, printing may be impossible with only the functions and resources of the existing premises network printer 3.

For example, the printing controllers 1a, 1b, and 1c on the home network do not always exist on the network after the function control command is given. In this case, the printing controllers 1a, 1b, and 1c do not exist on the home network anymore, after the contents to be printed is transmitted to the network printer 3, and the user closes the printing controller 1.

The above situation may occur when the printing controllers 1a, 1b, and 1c are digital cameras or cellular phones. Further, when printing an image from a digital camera, there are many cases in which the premises printer does not process printing at one time, according to the resolution.

When a printer to be used by the user is the network printer 3 that is used on the premises, if simultaneous requests are received from different users on the premises, such as family members who submit requests at similar times, the network printer 3 should manage the printing list. However, the home network printer 3 does not provide enough space to receive and mange the printing list and the associated contents.

Further, the printing controller 1a, 1b, or 1c should function as a contents server, and should be connected to the home network until its turn comes around.

When a general user uses a handheld mobile device as the printing controller 1a, 1b, or 1c, since the connection to the home network is kept until the printing request is completed, the user may be inconvenienced. In addition, the network printer 3 may not acquire the contents.

Figure 3:
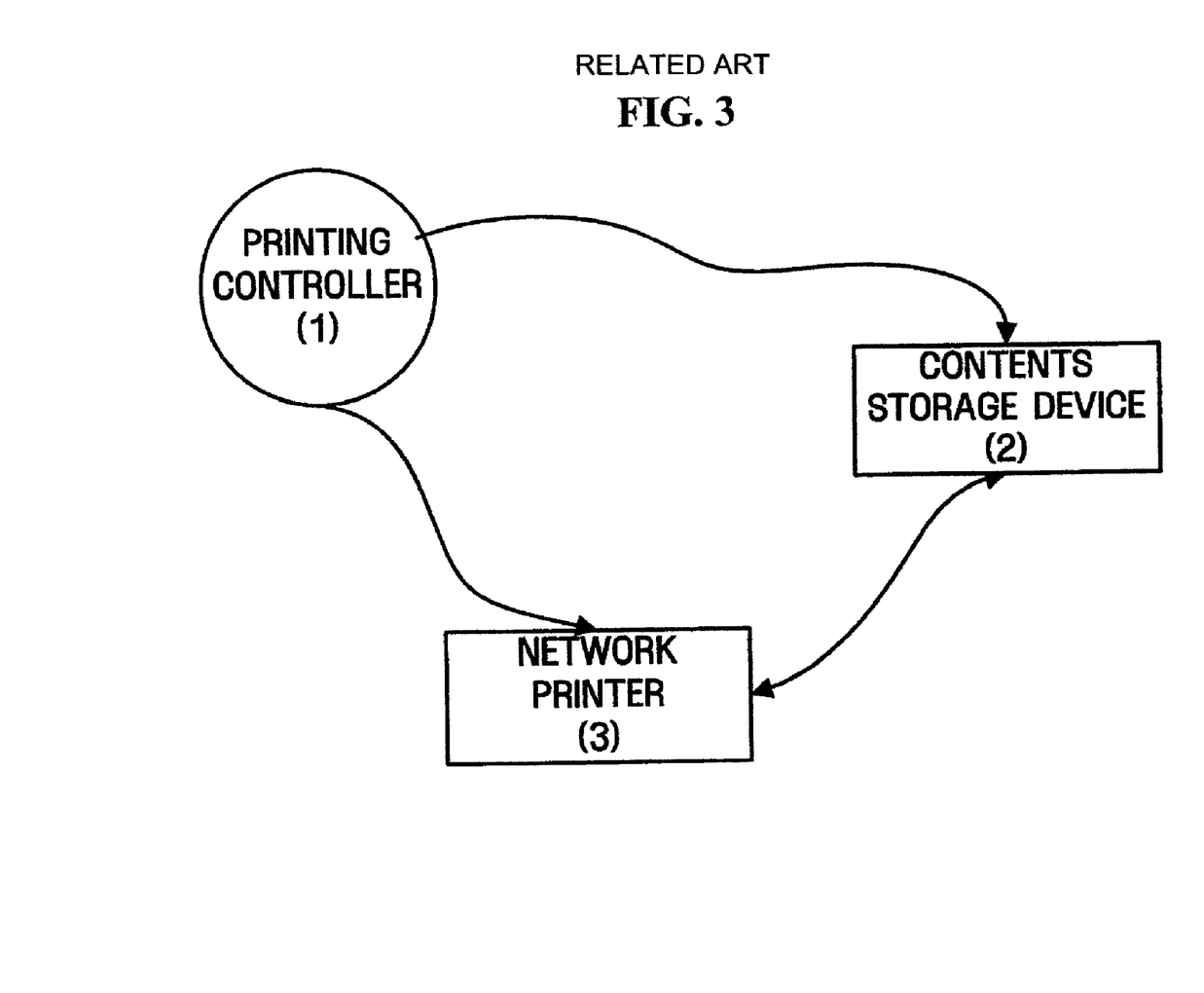
FIG. 3 is a diagram showing the operation of a related art network printer based on a contents storage device on a home network.

FIG. 3 is a diagram showing the operation of a related art network printer based on the contents storage device on the home network. Here, the network printer based on the contents storage device provides an improved environment in comparison with the known network printer shown in FIG. 2.

The user stores the contents to be printed in the contents storage device 2, then transmits the address of the contents storage device 2 to the network printer 3 to request printing.

Next, the network printer 3 downloads the contents from the contents storage device 2 and performs printing.

The network printer 3 can download the contents and perform printing based on the address of the storage device 2, in which the content is stored. However, in this case, the user needs to set a function of storing the contents in the storage device 2, and a function of informing the network printer 3 of the address of the contents storage device 2. Alternatively, the user must set an environment by using the printing controller 1.

Such additional environment setting causes an inconvenience to the user.

Korean Unexamined Patent Application No. 2005-077300 ("Network Printing System") discloses a network printing system that determines transmission of printing data according to a response signal received for a printing request signal, and causes a printer that receives the printing request signal to check a spooling status of data in printing, and to transmit the response signal according to a UPnP system. However, this system only prevents traffic congestion on a network, and mentions a technique that manages a printing device and performs a printing job, without needing an additional environment setting in a home network environment.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention efficiently performs a printing function using a network printing device and a media storage device on a home network together.

The present invention also systematically manages a printing request of a printing controller using a network printing device on a home network.

According to an aspect of the invention, there is provided an apparatus for processing a printing function on a home network. The apparatus includes a printing request management unit which processes a printing request transmitted from a printing controller on a home network; a media storage device processing unit which provides information on an available media storage device on the home network when printing job information is transmitted from the printing request management unit; and a printing management unit which downloads predetermined contents stored in the media storage device, and performs a printing job according to the printing request of the printing controller.

According to another aspect of the invention, there is provided a system for processing a printing function on a home network. The system includes a printing controller which requests a printing job of predetermined contents; a network printing device which judges executability based on printing job information transmitted upon the printing request, sets a storage position of the contents to be printed, and then performs a printing job; and a media storage device which is connected with the network printing device, and stores the predetermined contents transmitted from the printing controller.

According to another aspect of the invention, there is provided a method of processing a printing function on a home network. The method includes receiving a printing request from a printing controller on the home network; judging printing possibility based on printing job information transmitted when the printing request; and when it is judged that printing is possible, providing information of a media storage device that stores contents to be printed, generating a printing list based on the printing job information and the information of the media storage device, and performing printing of predetermined contents based on the generated printing list.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims and their legal equivalents. Like reference numerals refer to like elements throughout the specification.

Hereinafter, exemplary embodiments of the invention will be described in detail with reference to the accompanying drawings.

Figure 4:
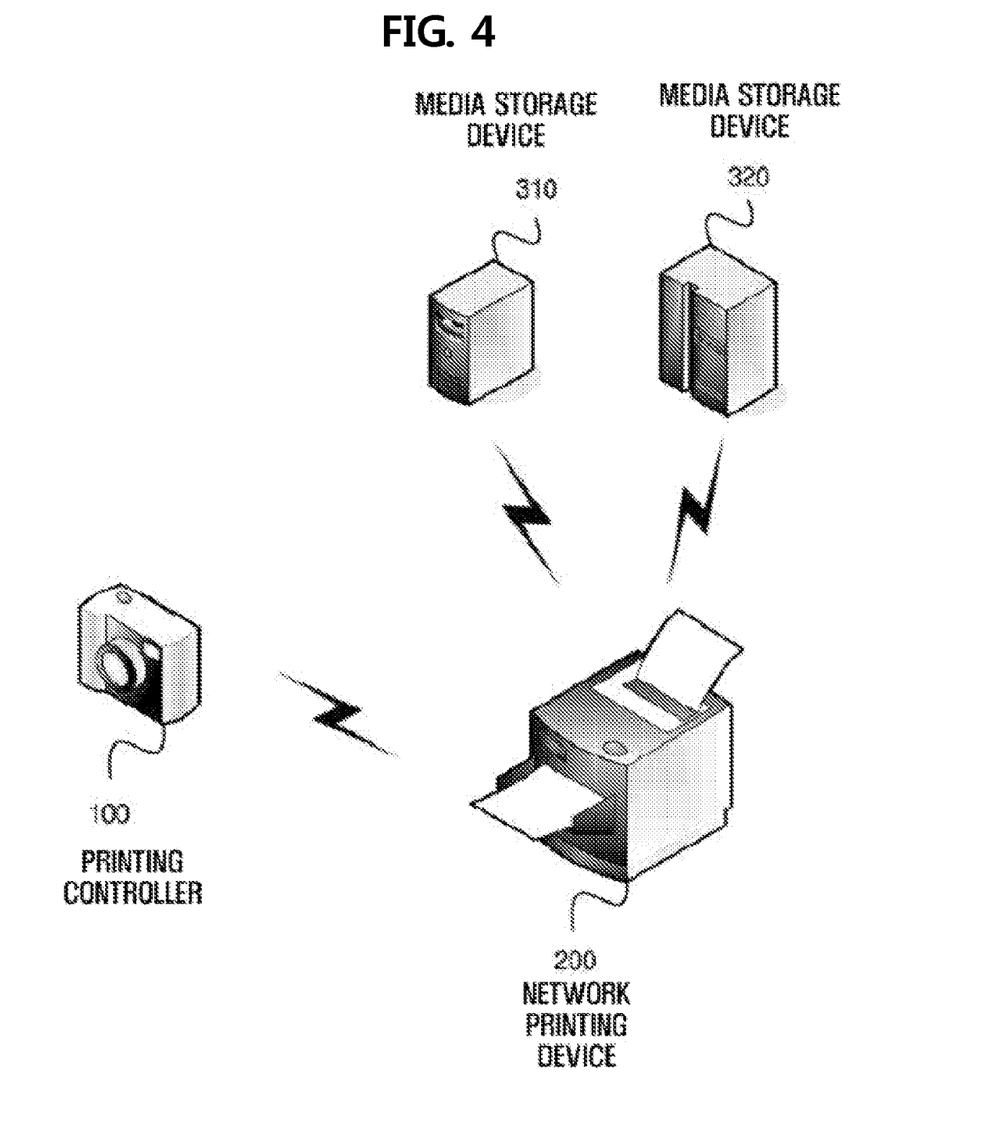
FIG. 4 is a diagram showing a system for processing a printing operation on a home network according to an exemplary embodiment of the invention.

FIG. 4 is a diagram showing a system for processing a printing operation on a home network according to an exemplary embodiment of the invention.

As shown in FIG. 4, a printing controller 100, a network printing device 200, and media storage devices 310 and 320 exist on a home network.

The printing controller 100 requests the premises network printing device 200 for printing, and controls the network printing device 200. Here, the printing controller 100 is a home device that discovers the premises network printing device 200 according to a home network protocol, and controls the premises network printing device 200 according to control rules. The printing controller 100 is not a printer driver-mounted product, such as a PC.

For example, the printing controller 100 can be a handheld mobile device, such as a digital camera or a cellular phone.

Further, the printing controller 100 supports a function of controlling a UPnP PrintEnhanced:1 Service by a handheld mobile device of the user.

The printing controller 100 provides only functions suitable for a home network environment, such as requesting printing and transmitting the contents to the network printing device 200. The specification of the printing controller 100 includes the "PrintBasic:1" specification and the "PrintEnhanced:1" specification of UPnP Image Working Committee, which is a home network standardization organization.

For example, the user requests the network printing device 200 for printing of the desired contents using the printing controller 100. The printing controller 100 and the network printing device 200 know commands related to discovery and control through a home network environment formation process, according to home network protocols.

At this time, the user does not directly transmit the contents to the printing controller 100, but first transmits printing job information, such as printing options and printing formats, to the network printing device 200.

Subsequently, when the transmitted printing job information is executable, the network printing device 200 transmits a response message to the printing controller 100. The response message includes an address, such as a URL address of a media storage device, to which the contents to be printed are transmitted.

The network printing device 200 is a network function-mounted home network printing device.

The network printing device 200 receives the printing request transmitted from the printing controller 100, generates a printing list according to the requested printing contents, and prints the contents based on the sequence of the printing list. The network printing device 200 supports a UPnP PrintEnhanced:1 Service, and has some functions of a UPnP Media Server Control Point.

The media storage devices 310 and 320 are network media storage devices that are available on the home network, and are connected to the network. The media storage devices 310 and 320 support a protocol for forming meta data of predetermined contents, and receiving and transmitting the contents. A plurality of media storage devices 310 and 320 may exist in a premises home network environment.

The media storage devices 310 and 320 are UPnP media servers and support UPnP AV services, such as a contents discovery service, a connection manager service, and an AV transmission service, for constructing a UPnP media server.

Figure 5:
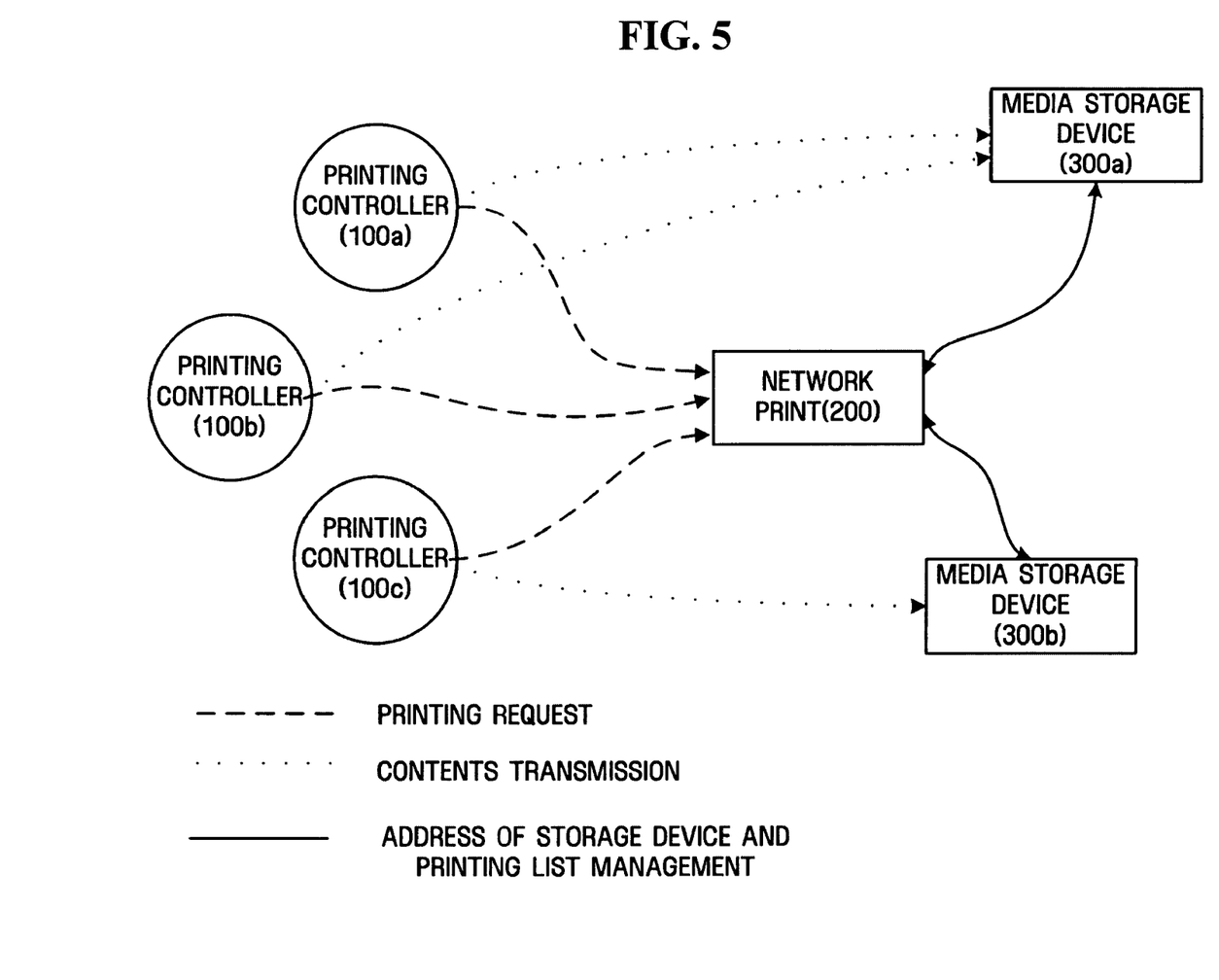
FIG. 5 is a diagram showing the operation of the system for processing a printing operation on the home network according to an exemplary embodiment of the invention.

FIG. 5 is a diagram showing the operation of a system for processing a printing operation on a home network according to an exemplary embodiment of the invention. In FIG. 5, an operation of performing a printing function on a home network is broadly divided into a process of forming an environment in which the network printing device 200 can operate on the home network, a process of allowing the printing controller 100 to request printing, and a process of performing printing according to the printing request.

In FIG. 5, the home network is constructed according to the UPnP protocol, and the individual devices have an environment in which a CP (Control Point) can control CDs (Controlled Devices) according to a UPnP discovery process.

Figure 6:
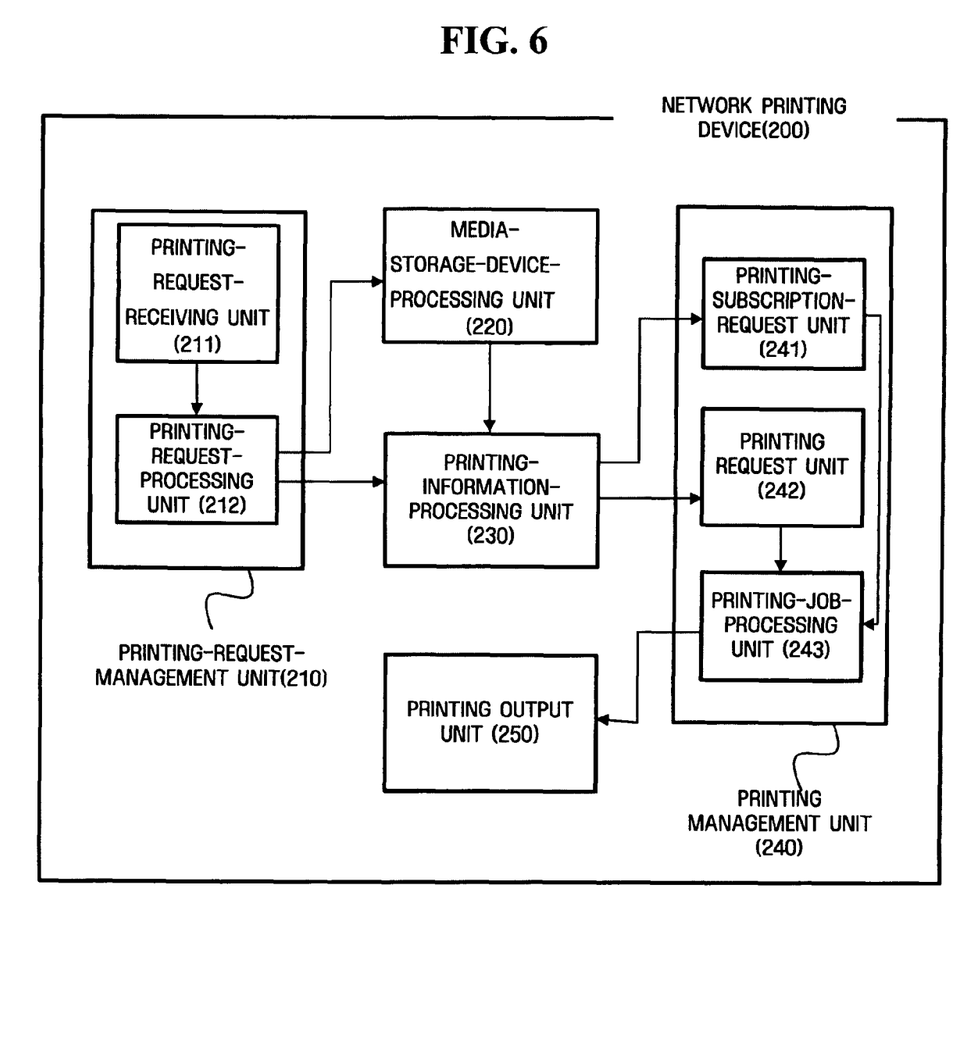
FIG. 6 is an internal block diagram of an apparatus for processing a printing operation on a home network according to an exemplary embodiment of the invention.

Further, as shown in FIG. 6, a media storage device processing unit 220 in the network printing device 200 discovers the premises media storage device 300 through the UPnP discovery process, and sets and manages a control environment by reading device and service descriptions for the media storage device 300.

First, the printing controller 100 discovers the network printing device 200 on the home network, and requests printing of specified contents. Then, the network printing device 200, which receives the printing request from the printing controller 100, judges whether or not the printing request is executable.

When the printing request is executable, the network printing device 200 generates meta data of the contents according to the printing request in a currently available media storage device 300.

Next, the network printing device 200 transmits a specified address in the media storage device 300 to the printing controller 100, such that the printing controller 100 can transmit the contents to be printed. Here, the printing controller 100 does not know information on the media storage device 300, and transmits the contents to the address according to the response of the network printing device 200. The printing controller 100 thinks that the specified printing contents are transmitted to the network printing device 200.

Then the printing controller 100 transmits the printing contents to the address according to the information transmitted from the network printing device 200.

Next, the network printing device 200 prints the contents based on the printing list. With reference to the printing list, if a turn to print the predetermined contents comes around, the network printing device 200 downloads the contents from the premises media storage device 300 based on the address of the media storage device 300.

Next, the network printing device 200 performs printing based on the printing options and formats transmitted from the printing controller 100, and the contents downloaded from the media storage device 300.

FIG. 6 is an internal block diagram of an apparatus for processing a printing operation on a home network according to an exemplary embodiment of the invention.

As shown in FIG. 6, the network printing device 200 includes a printing request management unit 210, a media storage device processing unit 220, a printing information processing unit 230, a printing management unit 240, and a printing output unit 250.

The printing request management unit 210 receives and processes the request of the printing controller 100 on the premises network, and includes a printing request receiving unit 211, and a printing request processing unit 212.

The printing request receiving unit 211 receives the printing request transmitted from the printing controller 100. The printing request has a form of a printing job, and includes information on printing options and printing formats.

For example, the printing controller 100 requests the network printing device 200 for printing before transmitting the contents to be printed. Then the printing request receiving unit 211 receives printing job information, such as printing options and printing formats, transmitted from the printing controller 100, and transmits the received printing job information to the printing request processing unit 212.

The printing request processing unit 212 judges whether or not the network printing device 200 can execute the printing job information transmitted from the printing request receiving unit 211, and requests information about the currently available media storage device 300 from the media storage device processing unit 220.

When the network printing device 200 can execute the printing job information, the printing request processing unit 212 transmits the printing job information to the media storage device processing unit 220, and stores an address of the media storage device 300 in which the specified contents transmitted from the media storage device processing unit 220 can be stored, and the printing job information transmitted from the printing controller 100 in the printing information processing unit 230.

The printing request processing unit 212 transmits the address of the media storage device 300, in which the specified contents transmitted from the media storage device processing unit 220 can be stored, and a response message indicating that printing is possible, to the printing controller 100.

However, if the network printing device 200 cannot execute the printing job information, the printing request processing unit 212 transmits a message indicating that printing of the contents is impossible to the printing controller 100.

The media storage device processing unit 220 manages available media storage devices 300 on the premises. For example, the media storage device processing unit 220 manages meta information and control information of the available media storage devices 300.

Further, when a request is received from the printing request processing unit 212, the media storage device processing unit 220 generates meta data for the contents through a control command in the available media storage device 300, and informs the printing request processing unit 212 of basic information and a URL address of the media storage device 300 to which the contents are to be transmitted.

The printing information processing unit 230 receives the printing job information from the printing request processing unit 212 and a contents accessible address of the media storage device 300 in which the contents is stored, and manages them as the printing list. The printing list is managed according to a sequence in which printing is requested or subscribed.

In addition, the printing information processing unit 230 requests the printing management unit 240 for the printing job of the contents based on the printing list.

The printing management unit 240 processes the printing request of the printing controller 100, and includes a printing subscription request unit 241, a printing request unit 242, and a printing job processing unit 243.

The printing subscription request unit 241 processes a subscription printing request, and receives and processes the subscription printing job from the printing information processing unit 230. Here, the subscription printing job is managed by the job printing subscription request unit 241 in a separate printing list, and this printing list is rearranged whenever a new printing job is added, so that the fastest job is located at the top of the list. Then the subscription printing job can be transmitted to the printing job processing unit 243 at a set subscription time, and printing can be performed.

For example, when a subscription printing job at the nearest time arrives based on the printing list, the printing subscription request unit 241 allows the printing job processing unit 243 to perform printing. If printing is currently being performed, the printing job processing unit 243 performs subscription printing after printing is completed.

If the current printing job is completed, the printing request unit 242 fetches the next printing job to be processed from the printing information processing unit 230, and requests the printing job processing unit 243 for printing. Here, the printing request unit 242 can request printing jobs according to the priorities of the printing jobs. The priority is determined based on a printing request time or a printing request order set by the user.

The printing job processing unit 243 receives the printing job from the printing subscription request unit 241 and the printing request unit 242, and performs printing of the contents. When there is no remaining printing job to be processed, the printing job processing unit 243 is changed to a standby mode.

When the printing request unit 242 requests printing of the predetermined contents, the contents are downloaded from the media storage device 300 based on the address of the media storage device 300 transmitted upon the printing request.

Next, the downloaded contents and the printing job information are transmitted to the printing output unit 250, and then printing is requested.

The printing output unit 250 performs an actual printing job based on the contents and the printing job information transmitted from the printing job processing unit 243.

In an exemplary embodiment of the present invention, the term "unit" means software and hardware constituent elements, such as a field programmable gate array (FPGA) or an application specific integrated circuit (ASIC). The unit serves to perform some functions, but is not limited to software or hardware. The unit may reside in an addressable memory. Alternatively, the unit may be provided to reproduce one or more processors. Therefore, examples of the unit include software elements, object-oriented software elements, class elements, task elements, processes, functions, attributes, procedures, subroutines, segments of program code, drivers, firmware, microcode, circuits, data, databases, data structures, tables, arrays, and parameters. The elements and the units may be combined with other elements and units, or divided into additional elements and units. In addition, the elements and the units may be provided to reproduce one or more central processing units (CPUs) in a device or a security multimedia card.

Figure 7:
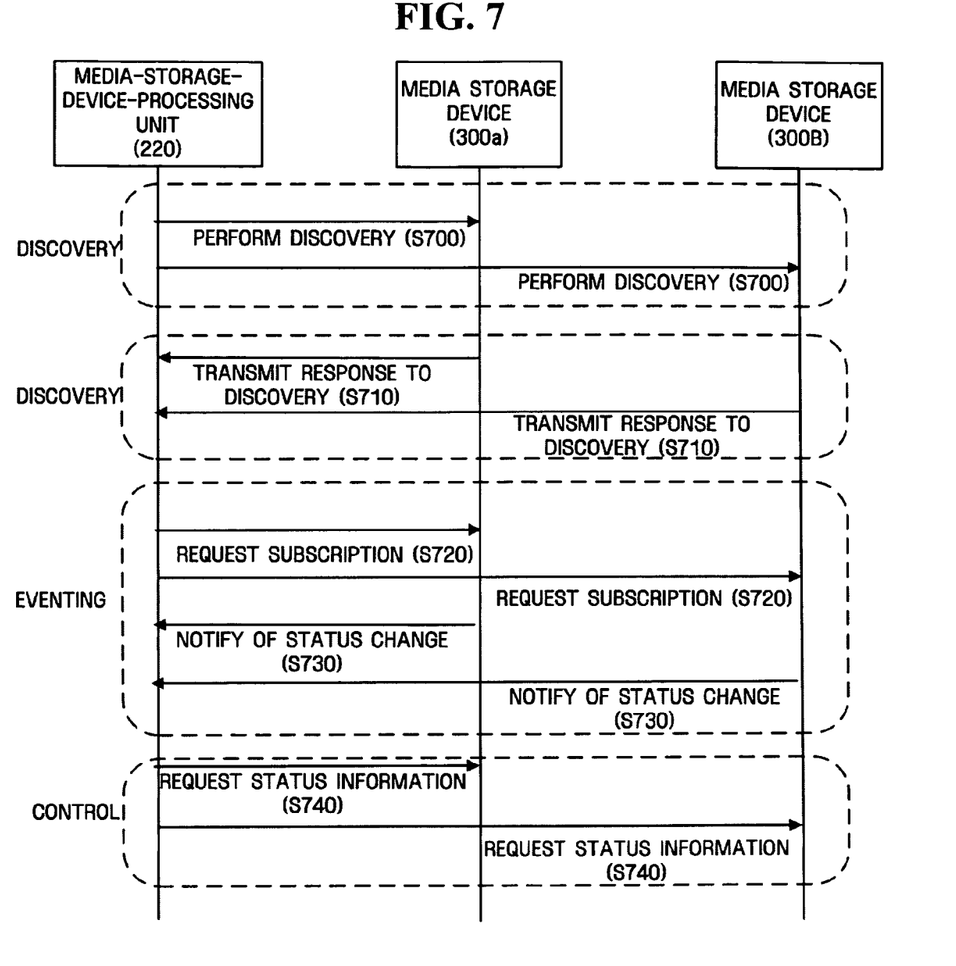
FIG. 7 is a flowchart showing the operation of a media storage device processing unit in a method of processing a printing operation on a home network according to an exemplary embodiment of the invention.

FIG. 7 is a flowchart showing an operation process of the media storage device processing unit in a method of processing a printing operation on a home network according to an exemplary embodiment of the invention. A process of causing the media storage device processing unit 220 to perform discovery, eventing, and control in order to manage the media storage device on the home network will be described in a case where a plurality of media storage devices 300 (300a and 300b) exist.

The network printing device 200 uses the premises media storage devices 300a and 300b in order to manage the printing contents transmitted from the printing controller 100. The network printing device 200 transmits a search message to the premises network as a multicast message according to the home network protocol, and proceeds with a process of discovering the premises media storage devices 300.

For example, in a UPnP environment, the network printing device 200 transmits the "Search message" to the premises network in multicast (S700). Then the media storage devices 300a and 300b on the premises network receive the "Search message" transmitted from the network printing device 200.

Further, when the media storage devices 300a and 300b transmit their presence in multicast through the premises network according to the home network protocol, the network printing device 200 receives the message and discovers the media storage devices 300a and 300b, and directly searches the media storage devices 300.

For example, in the UPnP environment, the media storage devices 300a and 300b transmit "Alive messages" to the premises in multicast (S710). Then the network printing device 200 receives the "Alive messages" transmitted from the media storage devices 300a and 300b and thus it can know that the media storage devices 300a and 300b exist on the premises network.

In the home network protocol, eventing is broadly divided into two stages. A network printing device 200 that wants transmission of a notification message requests the media storage device 300 for subscription. If the media storage device 300 receives the subscription request, when the status of the media storage device 300 changes afterward, the notification message is transmitted to all of the registered network printing devices 200.

For example, the media storage device processing unit 220 in the network printing device 200 is registered as an event subscriber in order to manage status information of the premises specified media storage devices 300a and 300b (S720).

Subsequently, when the status information is changed or when a specified event occurs, the media storage devices 300a and 300b transmit the notification message to the network printing device 200 that is registered as the event subscriber (S730).

In the home network environment, the network printing device 200 can fetch the status information of the managed media storage devices 300a and 300b through the control command. In the UPnP environment, the control command is transmitted and the response message to the control command is received through a Simple Object Access Protocol (SOAP) message protocol.

For example, when the network printing device 200 requests the media storage device 300a for current status information (S740), the media storage device 300a transmits the current status information according to the request.

Figure 8:
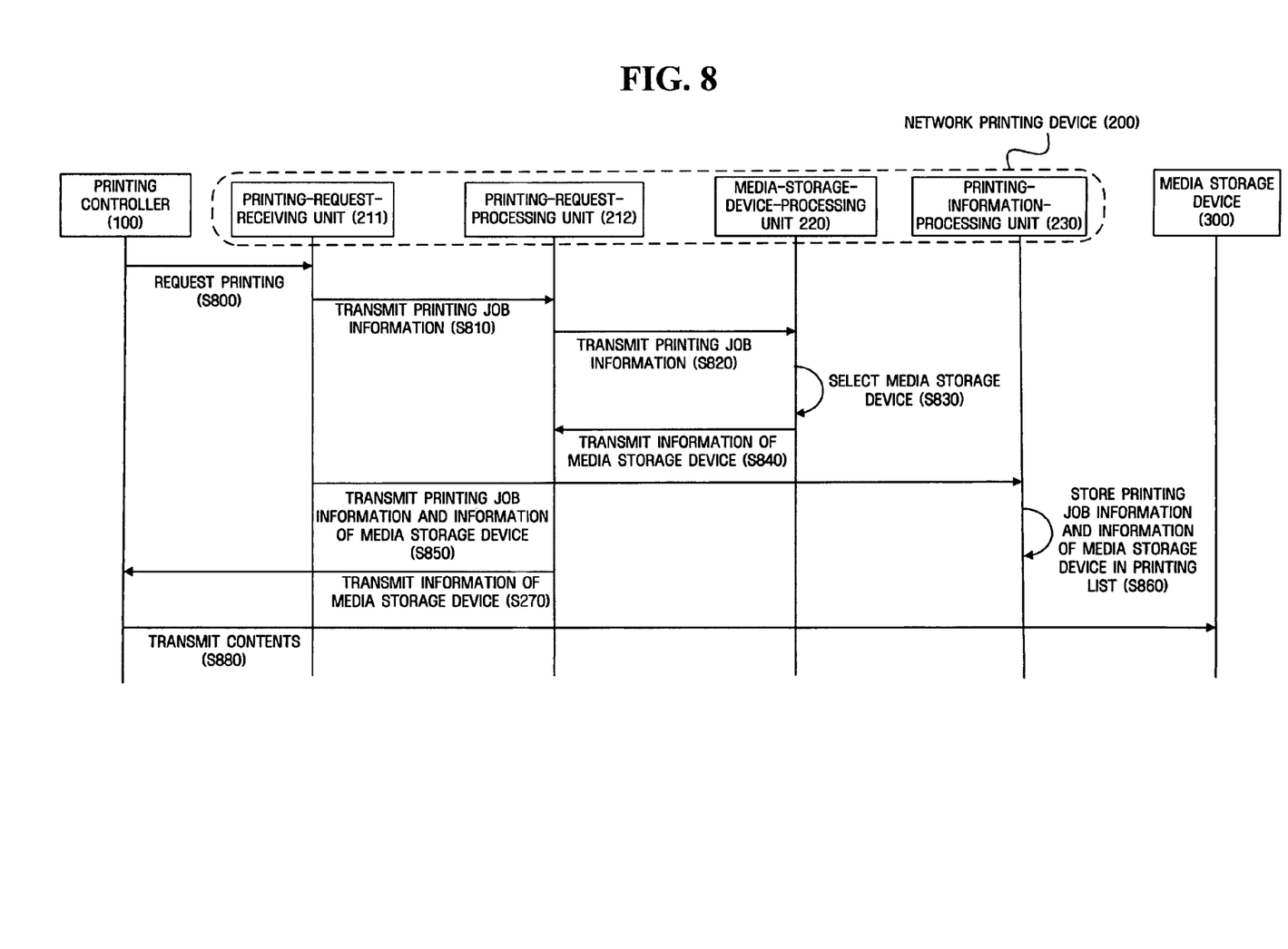
FIG. 8 is a flowchart showing a process of requesting printing in a method of processing a printing operation on a home network according to an exemplary embodiment of the invention.

FIG. 8 is a flowchart showing a process of requesting printing in a method of processing a printing operation on a home network according to an exemplary embodiment of the invention.

First, the printing controller 100 requests the printing request receiving unit 211 for printing (S800). The printing request has a form of a printing job, and includes printing job information on printing options and formats.

Next, the printing request receiving unit 211 transmits the printing job information to the printing request processing unit 212 (S810), and then the printing request processing unit 212 judges whether or not the network printing device 200 can execute the printing job information transmitted from the printing request receiving unit 211.

When the network printing device 200 can execute the printing job information, the printing request processing unit 212 transmits the printing job information to the media storage device processing unit 220 (S820). However, when the network printing device 200 cannot execute the printing job, the printing request processing unit 212 transmits a response message informing that printing cannot be performed to the printing controller 100.

Then the media storage device processing unit 220 selects one available media storage device 300 among the managed media storage devices 300 (S830), and generates the meta data for managing the specified contents in the media storage device 300 based on the printing job information. The generated meta data is used as information for downloading the contents upon execution of actual printing.

Next, the media storage device processing unit 220 transmits the URL address of the available media storage device 300, to which the printing contents can be transmitted, to the printing request processing unit 212 (S840). The URL address of the available media storage device 300 is used as information for allowing the printing controller 100 to transmit the printing contents.

Next, the printing request processing unit 212 transmits the printing job information and the information of the media storage device 300 to the printing information processing unit 230 (S850).

Subsequently, the printing information processing unit 230 stores the printing job information and the information of the media storage device 300 transmitted from the printing request processing unit 212 in the printing list (S860). The printing job information and the media storage device 300 are stored as printing information for predetermined printing contents to be printed.

Next, the printing request processing unit 212 transmits a response message informing that printing of the information of the media storage device 300 and the printing job information transmitted from the media storage device processing unit 220 is possible to the printing controller 100 (S870).

Then the printing controller 100 transmits the printing contents based on the URL address of the media storage device 300) transmitted from the printing request processing unit 212 (S880).

Figure 9:
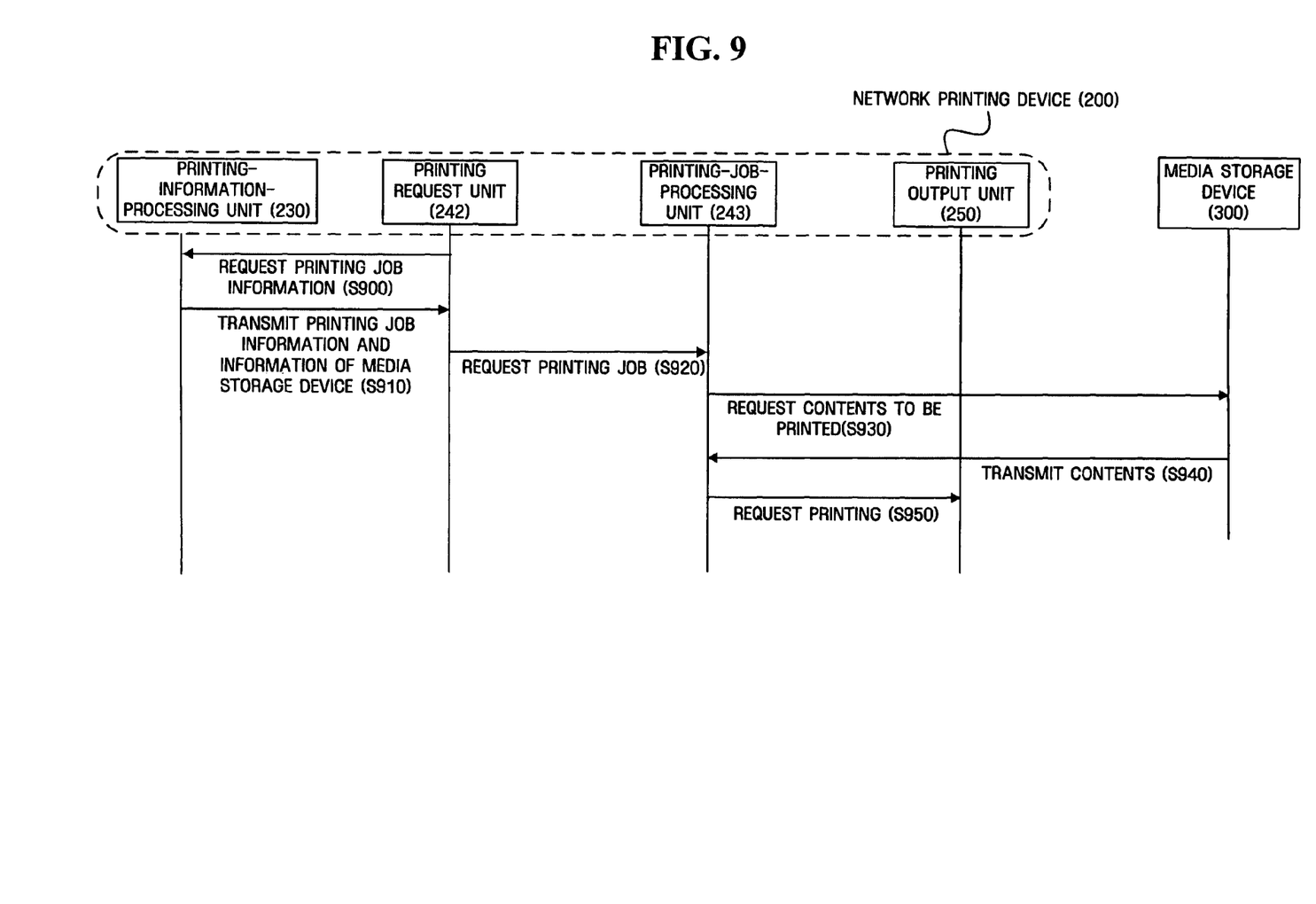
FIG. 9 is a flowchart showing a process of performing a printing operation in a method of processing a printing operation on a home network according to an exemplary embodiment of the invention.

FIG. 9 is a flowchart showing a process of performing a printing operation in a method of processing a printing operation on a home network according to an exemplary embodiment of the invention.

First, when current printing is completed, the printing request unit 242 requests printing job information for the next printing job to be performed from the printing information processing unit 230 (S900). If there is no current printing, the printing information processing unit 230 can request the printing request unit 242 to fetch printing job information for the next printing job to be performed.

If the printing information processing unit 230 transmits the printing job information and the information of the media storage device 300 according to the request of the printing request unit 242 (S910), the printing request unit 242 transmits the printing job information and the information of the media storage device 300 to the printing job processing unit 243 and requests printing (S920).

Next, the printing job processing unit 243 requests the media storage device 300 for the contents to be printed based on the printing job information and the information of the media storage device 300 (S930).

The media storage device 300 transmits the contents to the printing job processing unit 243 (S940), and the printing job processing unit 243 transmits the contents and printing job information to the printing output unit 250 and then requests printing (S950).

The printing output unit 250 performs a printing job based on the contents and the printing job information transmitted from the printing job processing unit 243.

Figure 10:
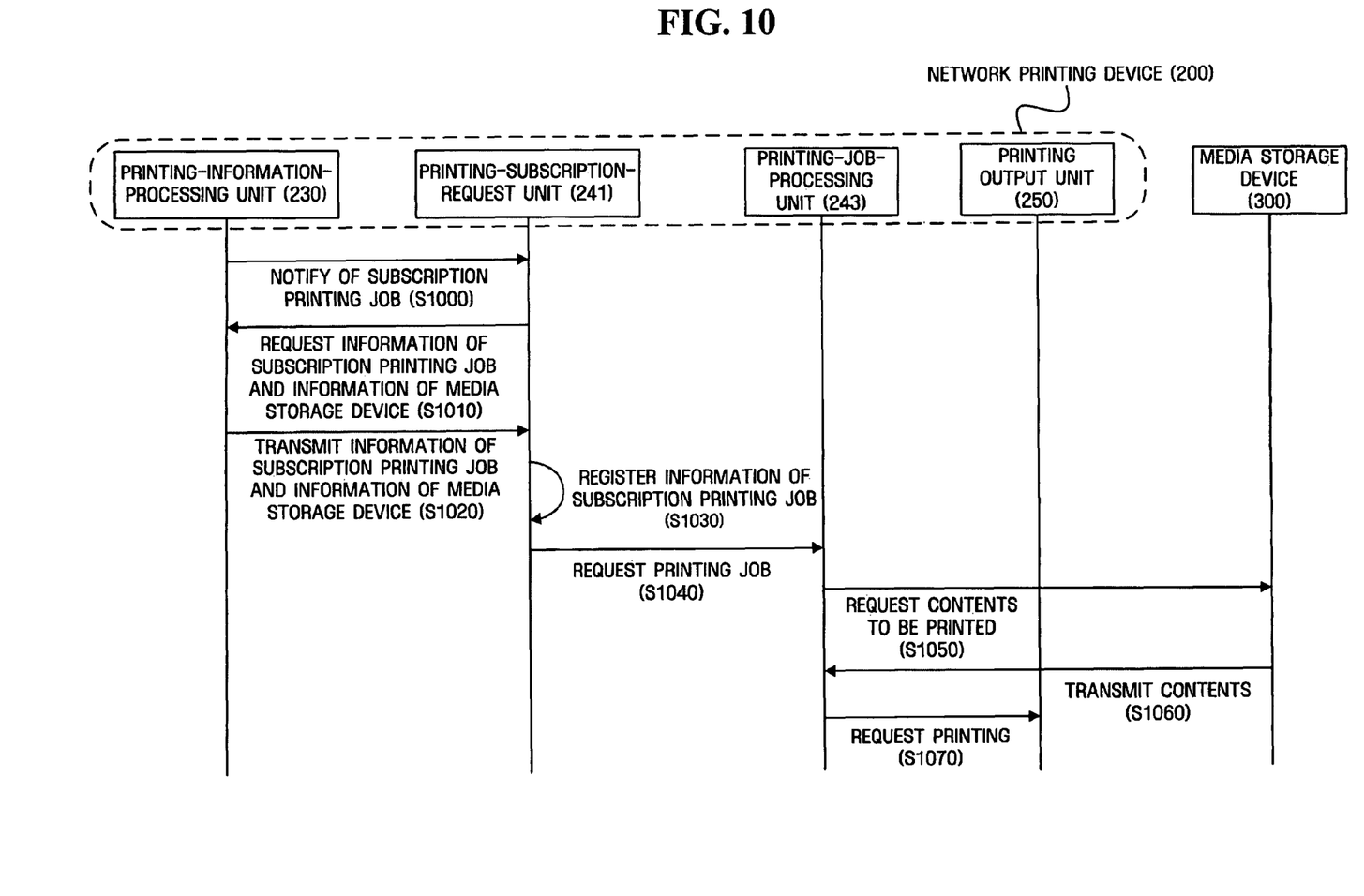
FIG. 10 is a flowchart showing a process of performing subscription printing in a method of processing a printing operation on a home network according to an exemplary embodiment of the invention.

FIG. 10 is a flowchart showing a process for processing subscription printing in a method of processing a printing operation on a home network according to an exemplary embodiment of the invention.

First, if a subscription printing request is transmitted from the printing controller 100, the printing information processing unit 230 informs the printing subscription request unit 241 that a subscription printing job is requested (S1000).

Next, the printing subscription request unit 241 requests the subscription printing job information and the information of the media storage device 300 from the printing information processing unit 230 (S1010). Then the printing information processing unit 230 transmits the subscription printing job information and the information of the media storage device 300 according to the request of the printing subscription request unit 241 (S1020).

Next, the printing subscription request unit 241 stores the subscription printing job information transmitted from the printing information processing unit 230 in a printing list (S1030). The printing list is reconstructed according to a subscription time whenever new printing job information is registered.

For example, printing job information closest to a subscription time is located at a first position of the printing list, and, if it is time to perform the printing job located at the first position, the printing subscription request unit 241 requests the printing job processing unit 243 for printing.

Next, when it is the subscription time, the printing subscription request unit 241 transmits the printing job information and the information of the media storage device 300 to the printing processing unit 234 (S1040). Then the printing job processing unit 243 requests the media storage device 300 for the contents to be printed based on the printing job information and the URL address of the media storage device 300 (S1050).

Next, the media storage device 300 transmits the contents according to the request of the printing processing unit 234 (S1060). Then the printing job processing unit 243 transmits the contents and the printing job information to the printing output unit 250 and requests printing (S1070).

The printing output unit 250 performs the printing job based on the contents and the printing job information transmitted from the printing job processing unit 243.

A process of performing a printing function on a home network according to an exemplary embodiment of the invention will be described.

The printing controller 100 transmits a CreateJobV2 Action message to the home network printing device 200 that is searched through the UPnP discovery process. The CreateJobV2 Action message includes JobName, DocumentFormat, MediaSize, MediaType, and PrintQuality.

Next, the printing controller 100 waits for information, such as JobId or DataSink, from the network printing device 200 as a response to the CreateJobV2 Action request. JobId allows the network printing device 200 to classify the requests of the printing jobs. DataSink is the URL address of the media storage device 300, to which the printing controller 100 can transmit the printing contents.

Next, the printing request receiving unit 211 transmits CreateJobV2 Action information received from the printing controller 100 to the printing request processing unit 212. Then the printing request processing unit 212 judges whether the network printing device 200 can perform printing based on the CreateJobV2 Action information.

When printing is impossible, the printing request processing unit 212 transmits a response indicating that printing is not possible to the printing controller 100. However, when printing is possible, the printing request processing unit 212 receives the information of a currently available media storage device 300 from the media storage device processing unit 220.

Next, the printing request processing unit 212 transmits the address of the available media storage device 300 for storing the specified contents and the printing job information to the printing information processing unit 230, such that the printing information processing unit 230 can manage the information.

Next, the printing request processing unit 212 responds with the information of JobId and DataSink as a response to CreateJobV2 of the printing controller 100. DataSink refers to the URL address of the media storage device 300, to which the printing contents can be transmitted.

Next, the printing controller 100 transmits the printing contents based on the DataSink from the network printing device 200. The printing controller 100 just transmits the printing contents to the address received from the network printing device 200. Information on a destination of the printing contents is not required.

Next, if the network printing device 200 ends current printing, the printing request unit 242 gets next printing job information from the printing information processing unit 230, and proceeds with printing. When there is no current printing job of the network printing device 200, the printing information processing unit 230 allows the printing request unit 242 to proceed with a standby printing job.

Next, if current printing is completed, the printing job processing unit 243 gets and executes next printing job information from the printing request unit 242. When there is no next printing job information in the printing request unit 242, the printing job processing unit 243 enters a standby mode.

Next, the printing job processing unit 243 gets contents to be printed from the premises media storage device 300, based on the information of the media storage device 300 transmitted from the printing request unit 242.

Next, the printing job processing unit 243 transmits the printing job information and printing contents to the printing output unit 250 and requests printing.

Although the present invention has been described in connection with exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According to the above-described apparatus, system, and method of processing a printing function on a home network of the invention, the following effects may be obtained.

Since the network printing device and the media storage devices on the home network are used together, the printing function can be efficiently performed.

Further, by using the network printing device on the home network, it is possible to systematically manage a printing job request from the printing controller.

In addition, an appropriate environment is provided to the user such that all devices, such as mobile devices including digital cameras and cellular phones, which can be used as premises printing function-mounted devices, can use the premises network printer. Therefore, the user does not need to wait until printing is completed before requesting printing of the contents and transmitting the contents, and does not need to attempt printing again upon rejection of the printing request by the printer.

What is claimed is:

1. An apparatus for processing a printing function on a home network, the apparatus comprising:
 a processor comprising:
  a printing request management unit which processes a printing request transmitted by a printing controller on the home network;
  a media storage device processing unit which provides, to the printing controller, address information on a media storage device on the home network based on printing job information transmitted by the printing request management unit; and
  a printing management unit which downloads contents stored in the media storage device, and performs a printing job of the contents according to the printing request transmitted by the printing controller, wherein the stored contents have been directly transmitted to the media storage device from the printing controller based on the address information on the media storage device provided by the media storage device processing unit, and wherein the media storage device processing unit provides, to the printing controller, the address information on the media storage device before the printing management unit performs the printing job of the contents.

2. The apparatus of claim 1, further comprising:

a printing information processing unit which generates and manages a printing list based on the printing job information transmitted by the printing request management unit and the information of the media storage device; and a printing output unit which receives the printing job information and the contents from the printing management unit, and performs a printing job.

3. The apparatus of claim 1, wherein the printing request management unit comprises:

a printing request receiving unit which receives the printing request transmitted by the printing controller, and a printing request processing unit which judges executability of the printing request based on the printing job information, and provides the printing controller with the address information of the media storage device.

4. The apparatus of claim 1, wherein the printing management unit comprises:

a printing subscription request unit which receives and manages information on a printing job that is subscribed in a printing information processing unit, a printing request unit which receives and manages information on a printing job to be currently processed from the printing information processing unit, and a printing job processing unit which downloads contents to be printed, and performs a printing job based on the information of the media storage device included in the printing job information.

5. A system for processing a printing function on a home network, the system comprising:

a printing controller which requests a printing job;

a network printing device which judges executability of the printing job based on printing job information transmitted from the printing controller, sets a storage position of contents to be printed, provides the storage position to the printing controller, and performs the printing job, the network printing device providing the storage position of the contents to the printing controller before performing the printing job; and a media storage device which is communicably linked to the network printing device, and stores contents which are directly received from the printing controller based on the storage position provided by the network printing device, and wherein the network printing device receives the stored contents from the media storage device and performs the printing job for the received contents.

6. The system of claim 5, wherein the network printing device comprises:

a printing request management unit which processes printing request transmitted by the printing controller;

a media storage device processing unit which provides information on an available media storage device on the home network based on printing job information transmitted by the printing request management unit; and a printing management unit which downloads contents stored in the media storage device and performs a printing job for the downloaded contents according to the printing request of the printing controller.

7. A method of processing a printing function on a home network, the method comprising:

receiving by a printing device, a printing request from a printing controller on the home network;

determining by the printing device, whether printing of the printing request is possible based on printing job information transmitted with the printing request;

providing by the printing device, to the printing controller, address information of a media storage device that stores contents to be printed if it is determined that the printing is possible;

generating by the printing device, a printing list based on the printing job information and the information of the media storage device;

directly transmitting the contents to be printed to the media storage device from the printing controller based on the address information of the media storage device provided by the printing device; and performing by the printing device, printing of the contents received from the media storage device based on the generated printing list, wherein the address information of the media storage device is provided to the printing controller before the printing of the contents is performed.

8. The method of claim 7, wherein the providing of the address information of the media storage device that stores the contents to be printed if it is determined that the printing is possible comprises:

selecting by the printing device, a media storage device among media storage devices on the home network; and providing by the printing device, address information of the selected media storage device to the printing controller.

9. The method of claim 7, wherein the performing of printing the contents comprises:

checking a set printing subscription time if subscription printing is requested by the printing controller; and performing a subscription printing job based on the checked printing subscription time.

10. The method of claim 7, wherein the transmitting the contents to be printed comprises:

receiving the address information of the media storage device from the printing device; and transmitting the contents to be printed based on the address information of the media storage device.

* * * * *